United States Patent
Suzuki

(10) Patent No.: US 11,501,534 B2
(45) Date of Patent: Nov. 15, 2022

(54) INFORMATION PROCESSING APPARATUS, INFORMATION PROCESSING SYSTEM, INFORMATION PROCESSING METHOD, AND STORAGE MEDIUM

(71) Applicant: CANON KABUSHIKI KAISHA, Tokyo (JP)

(72) Inventor: Yutaka Suzuki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 17/067,437

(22) Filed: Oct. 9, 2020

(65) Prior Publication Data
US 2021/0110165 A1 Apr. 15, 2021

(30) Foreign Application Priority Data
Oct. 15, 2019 (JP) ............... JP2019-188340

(51) Int. Cl.
*G06V 20/40* (2022.01)
*G06V 20/20* (2022.01)

(52) U.S. Cl.
CPC ............. *G06V 20/47* (2022.01); *G06V 20/20* (2022.01); *G06V 20/41* (2022.01)

(58) Field of Classification Search
CPC ........ G06V 20/47; G06V 20/20; G06V 20/41; G06V 20/40; H04N 21/23418; H04N 21/8549; H04N 7/188

USPC ........................................... 382/103
See application file for complete search history.

(56) References Cited

U.S. PATENT DOCUMENTS

| | | | |
|---|---|---|---|
| 2004/0017504 A1* | 1/2004 | Prandoni | H04N 7/188 348/370 |
| 2009/0103898 A1* | 4/2009 | Morioka | G11B 27/28 386/326 |
| 2013/0027551 A1* | 1/2013 | Peleg | G11B 27/28 382/167 |
| 2016/0180884 A1* | 6/2016 | Nowak | H04W 4/80 386/201 |
| 2016/0321506 A1* | 11/2016 | Fridental | H04N 21/4788 |
| 2016/0372157 A1* | 12/2016 | Funagi | H04N 5/91 |

FOREIGN PATENT DOCUMENTS

JP 4972095 B2 7/2012

* cited by examiner

*Primary Examiner* — Neil R McLean
(74) *Attorney, Agent, or Firm* — Canon U.S.A., Inc. IP Division

(57) ABSTRACT

The information processing apparatus includes an acquisition unit configured to acquire a plurality of videos captured by a plurality of imaging apparatuses, an extraction unit configured to extract one or more pieces of object information each representing a trajectory of an object from each of the plurality of videos acquired by the acquisition unit, and a generation unit configured to generate a synopsis video obtained by gathering objects on one background image based on the object information extracted by the extraction unit.

18 Claims, 13 Drawing Sheets

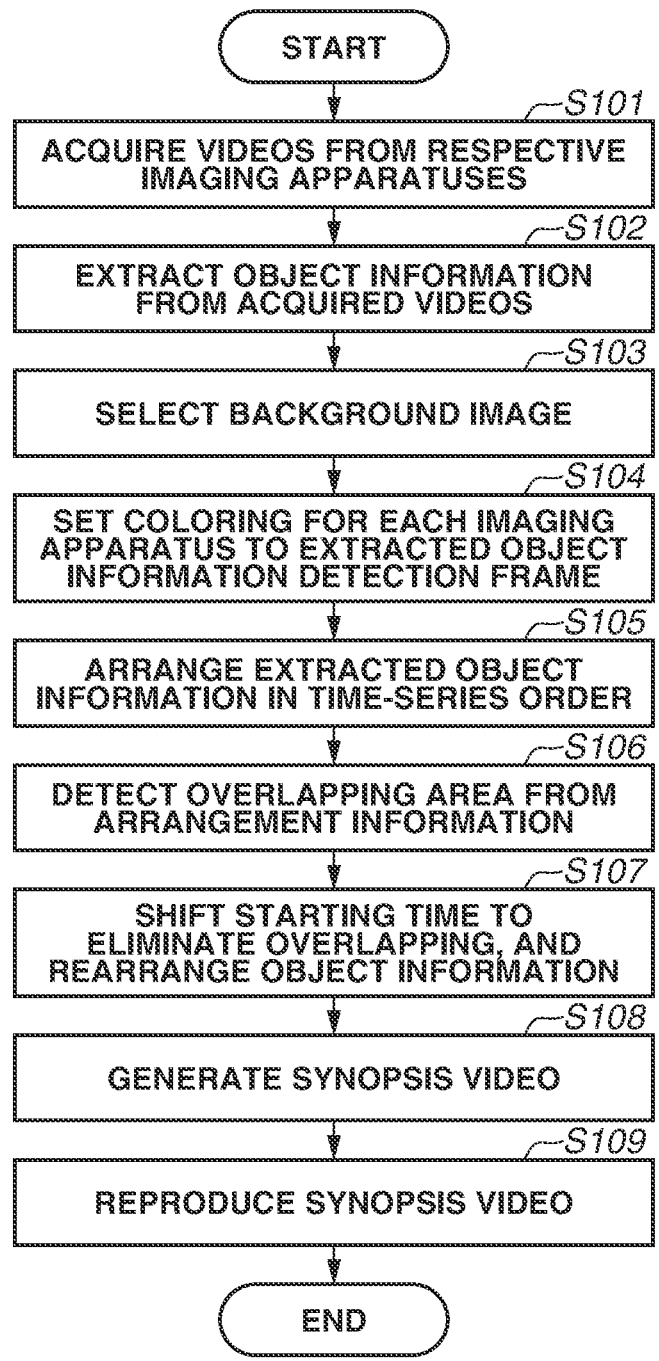

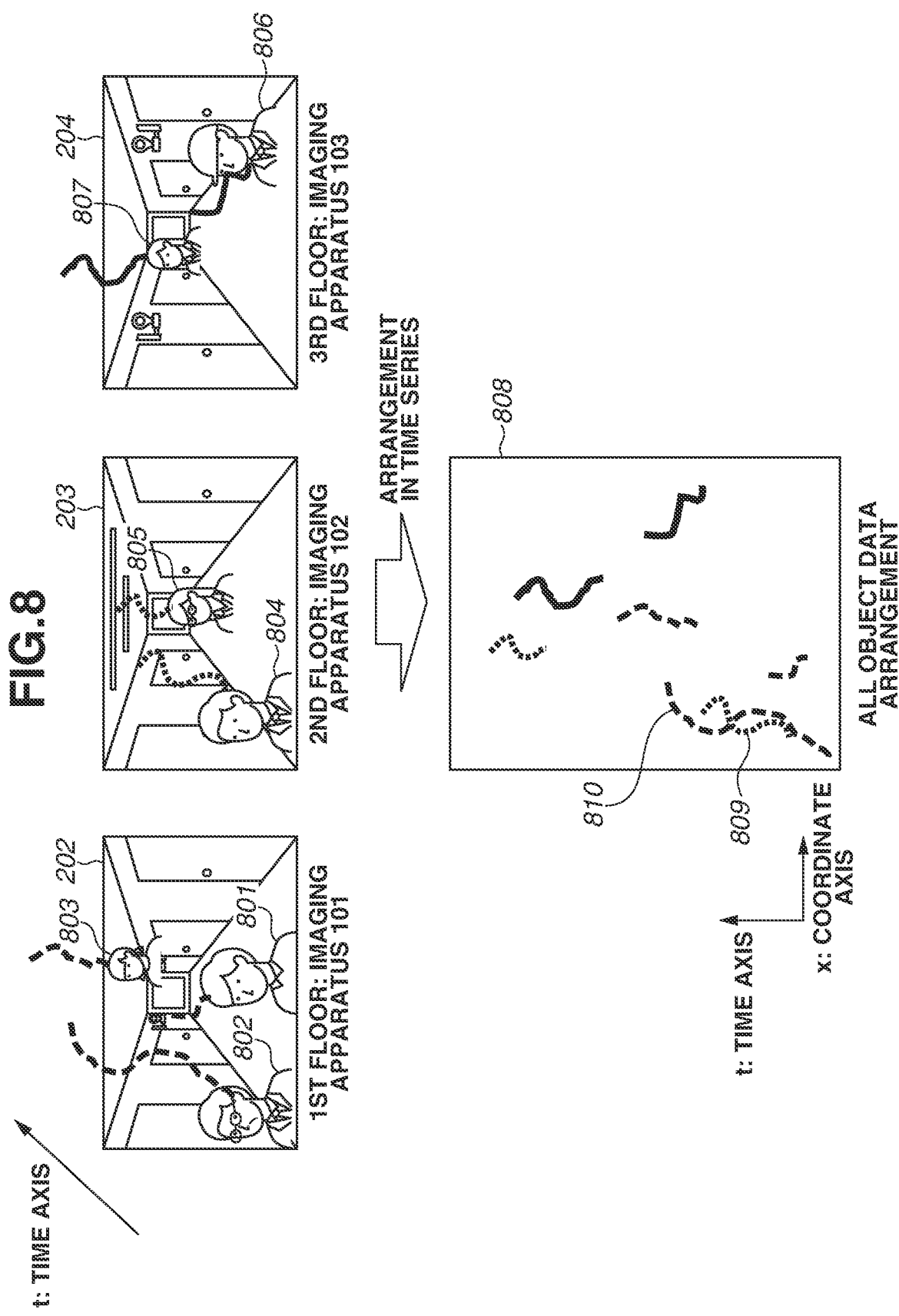

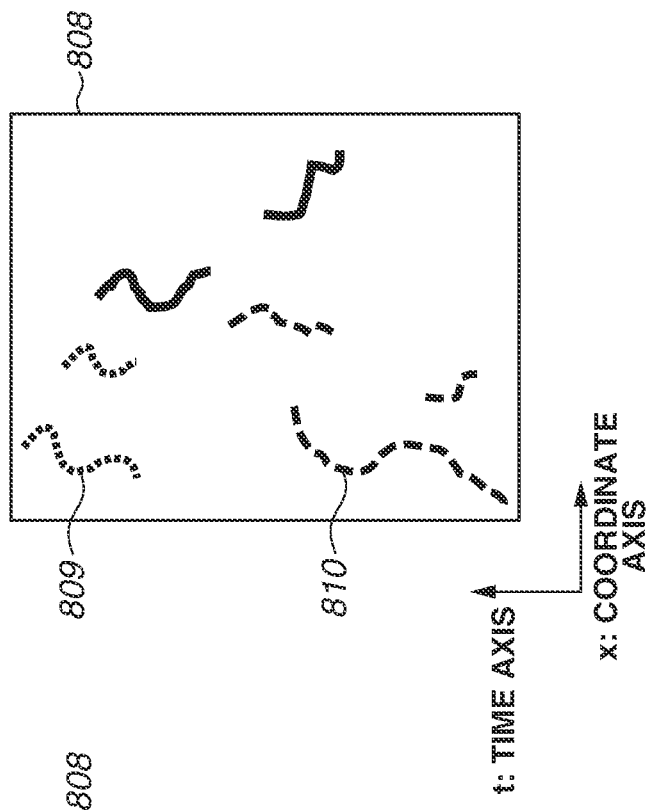
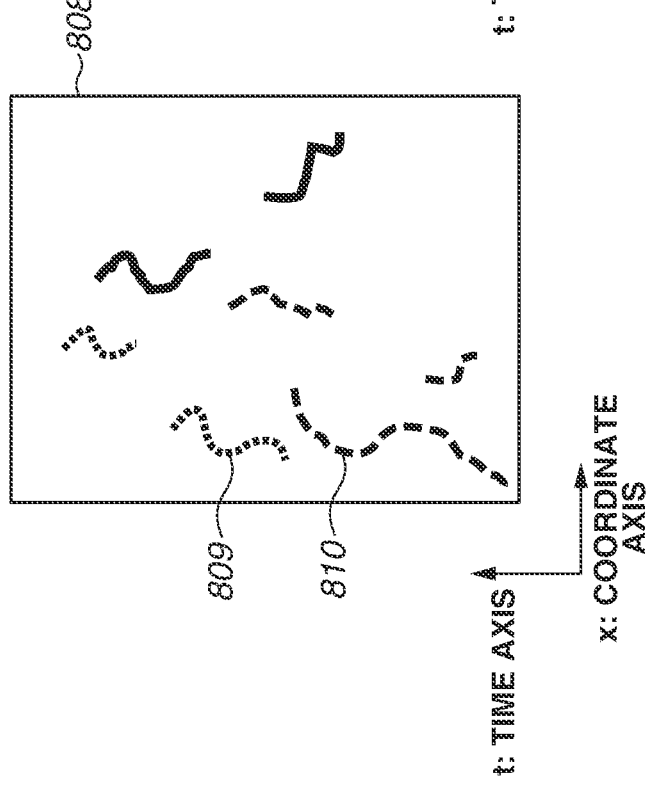

SUMMARIZED OBJECT TRAJECTORIES

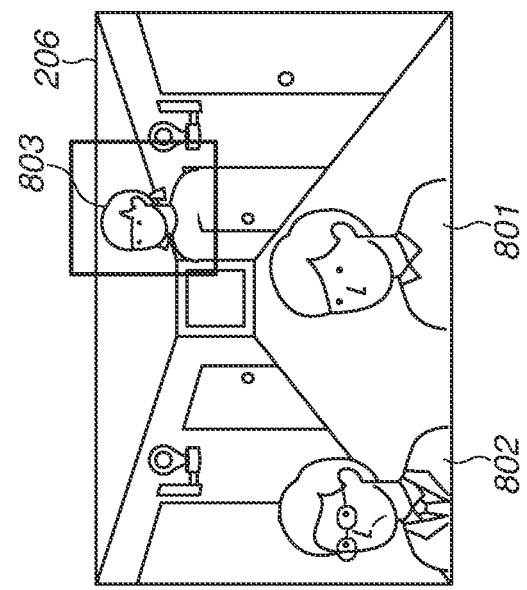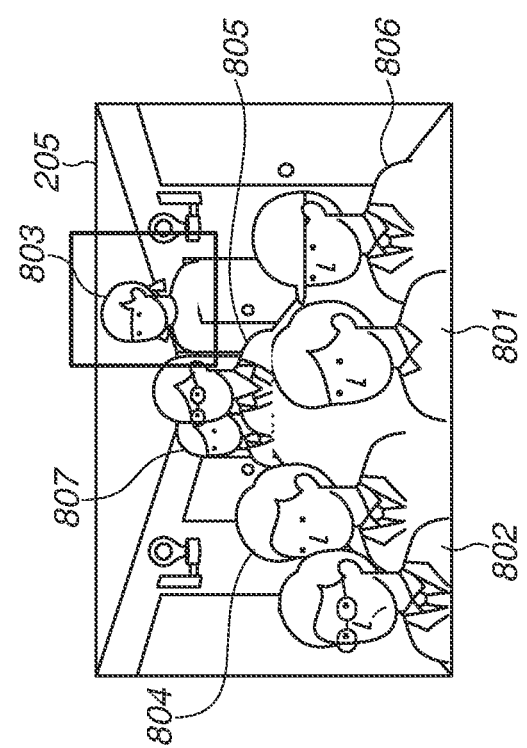
FIG.12

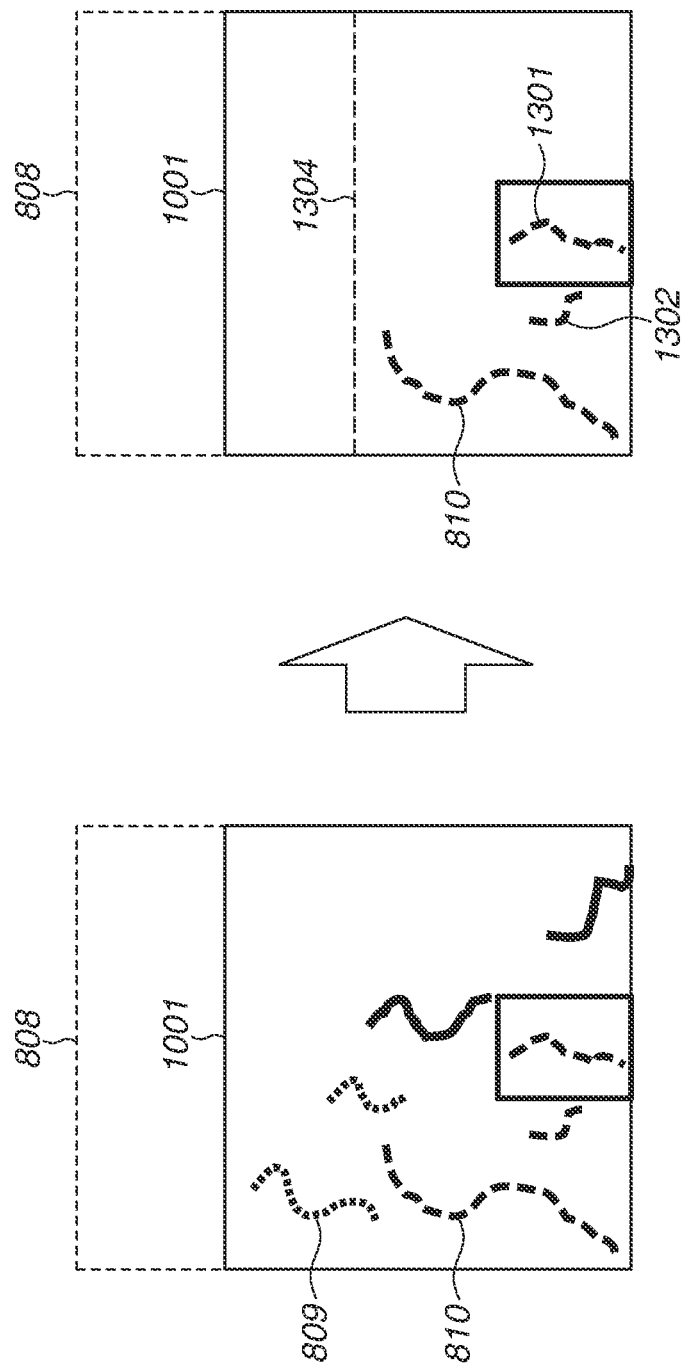

INFORMATION PROCESSING APPARATUS, INFORMATION PROCESSING SYSTEM, INFORMATION PROCESSING METHOD, AND STORAGE MEDIUM

BACKGROUND OF THE INVENTION

Field of the Invention

The present disclosure relates to an information processing apparatus, an information processing system, an information processing method, and a storage medium.

Description of the Related Art

In recent years, utilization of a video having a long recording time has increased. A video captured by a network camera installed in a store or on a road, for example, is used in various kinds of applications such as remote monitoring, crime prevention, and marketing for analyzation of a customer traffic state in a store. The video is recorded in a recording device such as a digital video recorder (DVR) and a network video recorder (NVR) so that the video can be used later. A video analysis system that can count objects such as a person and a vehicle included in the video and can detect an object passing a line drawn in the video by a user has been known.

However, the video having the long recording time often includes a time period in which there is no movement or no change for a long time in the video. As a result, checking of the recorded image requires a long time, which may cause issues such as overlooking of a target.

Japanese Patent No. 4972095 discusses a technique in which moving targets displayed at different times in an original video are displayed at a time to summarize the original video in a short-time video. The technique enables checking of only moving objects in the recorded video in a short time, which makes it possible to reduce possibility of overlooking the target.

SUMMARY OF THE INVENTION

According to an aspect of the present disclosure, an information processing apparatus changes an appearance order of targets detected in a video to generate a synopsis video, and includes an acquisition unit configured to acquire a plurality of videos captured by a plurality of imaging apparatuses, an extraction unit configured to extract one or more pieces of object information each representing a trajectory of an object from each of the plurality of videos acquired by the acquisition unit, and a generation unit configured to generate a synopsis video obtained by gathering objects on one background image based on the object information extracted by the extraction unit.

Further features of the present disclosure will become apparent from the following description of exemplary embodiments with reference to the attached drawings.

BRIEF DESCRIPTION OF THE DRAWINGS

FIG. 6 is a flowchart illustrating processing by the terminal according to the first exemplary embodiment of the present disclosure.

FIG. 8 is a diagram illustrating an overlapping area.

FIGS. 9A and 9B are diagrams each illustrating an example of the processing in FIG. 6.

FIG. 12 is a diagram illustrating the synopsis video, where a diagram on a left side illustrates the synopsis video in which original videos illustrated in FIG. 8 are collectively displayed and a diagram on a right side illustrates the synopsis video from only an original video illustrated in FIG. 8.

FIG. 13 is a diagram illustrating an all object information arrangement diagram, where a diagram on a left side is the all object information arrangement diagram same as in the diagram in FIG. 10, and a diagram on a right side is an all object information arrangement diagram of the synopsis video illustrated in the diagram on the right side in FIG. 12.

DESCRIPTION OF THE EMBODIMENTS

Exemplary embodiments of the present disclosure are described in detail below with reference to accompanying drawings. The exemplary embodiments described below are merely examples of implementation of the present disclosure, and are appropriately corrected or modified depending on a configuration of an apparatus to which the present disclosure is applied and various kinds of conditions. The present disclosure is not limited to the exemplary embodiments described below. Further, not all combinations of features described in the exemplary embodiments are necessarily essential to the solving means of the present disclosure.

Figure 1:
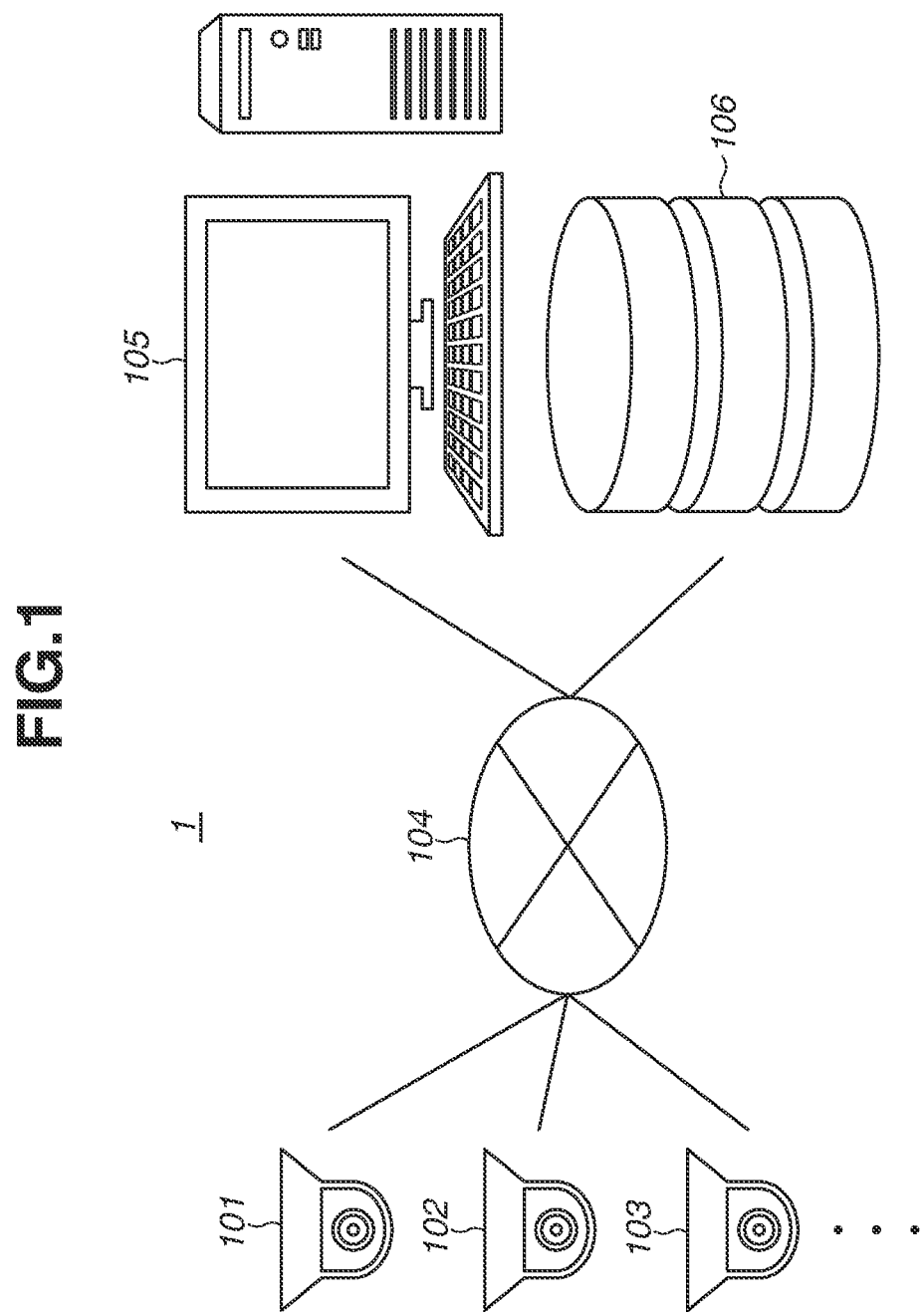
FIG. 1 is a configuration diagram of a synopsis video generation system according to a first exemplary embodiment of the present disclosure.

FIG. 1 is a system configuration diagram of a synopsis video generation system 1 according to a first exemplary embodiment of the present disclosure. As illustrated in FIG. 1, the synopsis video generation system 1 has a configuration in which imaging apparatuses 101 to 103, a terminal 105, and a storage 106 are connected through a network (internet protocol (IP) network) 104. The imaging apparatuses 101 to 103 are, for example, network cameras. The terminal 105 is an apparatus that processes predetermined information. Thus, the terminal 105 may be referred to as an information processing apparatus. Each of the imaging apparatuses 101 to 103 is installed on a ceiling of a hotel or a train and continuously performs imaging to capture a long-time video (including audio data). Each of the imaging apparatuses 101 to 103 transmits an original video that is acquired by imaging and is to be subjected to analysis processing to the terminal 105 via the network 104.

The terminal 105 is an apparatus that displays original videos and various kinds of information from the imaging apparatuses 101 to 103 and remotely operates the imaging apparatuses 101 to 103. The terminal 105 is, for example, a personal computer. The personal computer is an example of a general-purpose computer and is referred to as a PC, in the description below. The terminal 105 has functions of receiving the original videos from the imaging apparatuses 101 to 103 via the network 104 and displaying the original videos. The terminal 105 further includes a function of issuing various kinds of commands to the imaging apparatuses 101 to 103.

The storage 106 is a storage device that stores the original videos captured by the imaging apparatuses 101 to 103 and various kinds of setting values. The storage 106 may be a recording device such as a digital video recorder (DVR) and a network video recorder (NVR). The storage 106 may store an image acquired from an external device (not illustrated) in addition to the videos from the imaging apparatuses 101 to 103, The external device includes a portable storage medium such as a secure digital (SD) memory card and a digital versatile disc (DVD) in addition to another terminal.

While three imaging apparatuses 101 to 103, one terminal 105, and one storage 106 are illustrated in FIG. 1, the number of devices is not particularly limited thereto. In addition, the terminal 105 and the storage 106 may be connected not via the network 104 but by a physical connection such as a universal serial bus (USB) connection. Furthermore, the storage 106 may be incorporated in the terminal 105.

Figure 2:
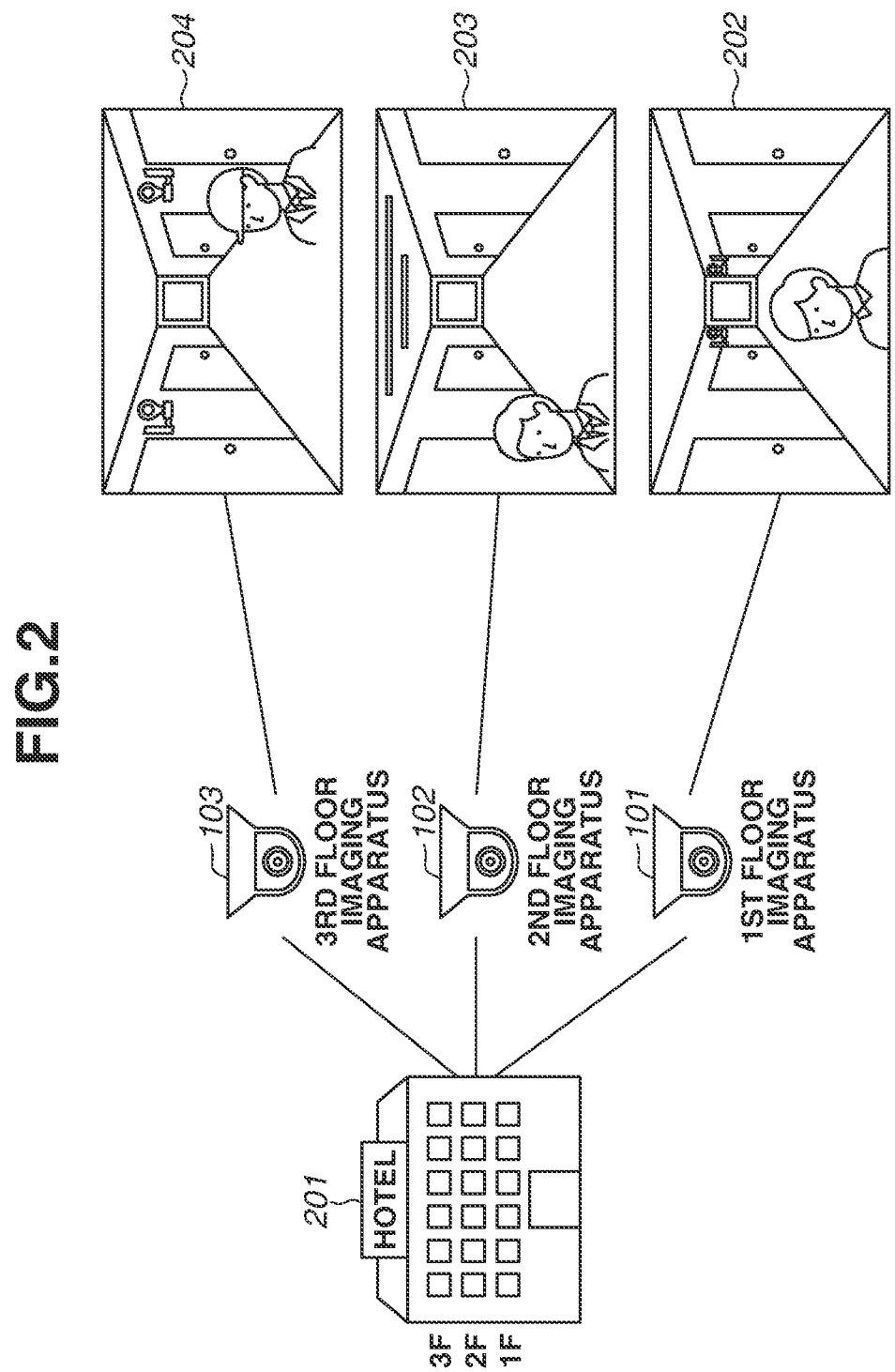
FIG. 2 is a conceptual diagram illustrating a usage example of the synopsis video generation system.

FIG. 2 is a conceptual diagram illustrating a usage example of the synopsis video generation system 1. In the example of FIG. 2, the imaging apparatuses 101 to 103 are respectively installed in corridors of first to third floors of a hotel 201. Original videos 202 to 204 illustrated in FIG. 2 are respectively captured by the imaging apparatuses 101 to 103. As understood from FIG. 2, backgrounds in the original videos 202 to 204 are substantially the same although illumination and decoration are slightly different.

While FIG. 2 illustrates the example of the hotel, a scene in which the backgrounds in the original videos captured by the respective imaging apparatuses are similar to one another is not limited to the hotel. For example, similar original videos are captured by a plurality of imaging apparatuses installed in cars of a train.

Figure 3:
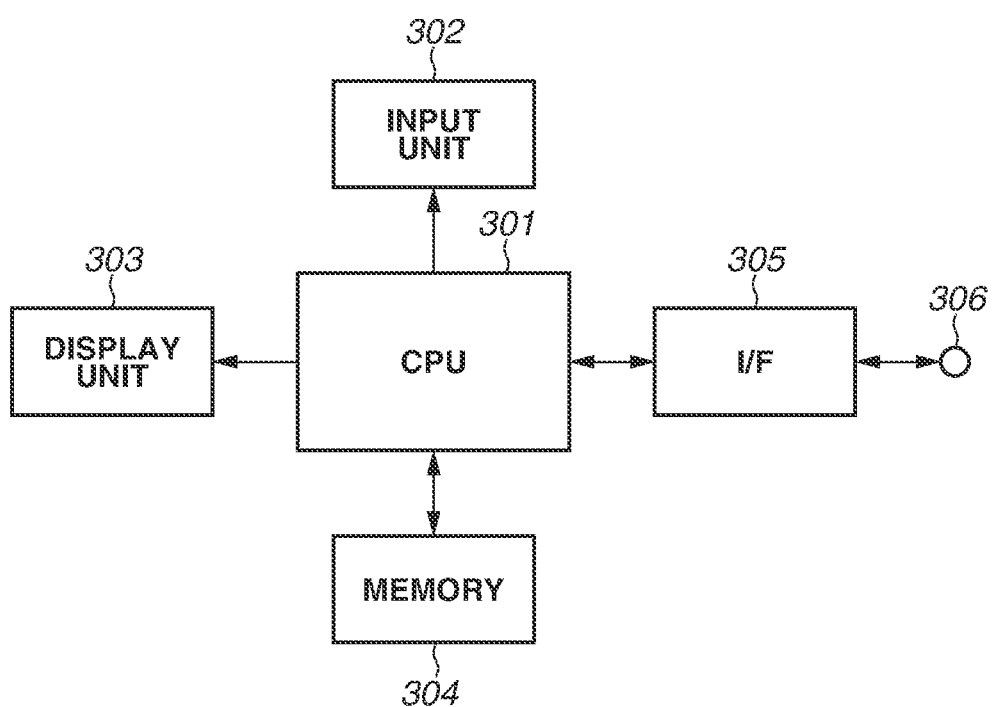
FIG. 3 is a diagram illustrating an example of a hardware configuration of a terminal.

FIG. 3 is a diagram illustrating an example of a hardware configuration of the terminal 105. As illustrated in FIG. 3, the terminal 105 includes a central processing unit (CPU) 301, an input unit 302, a display unit 303, a memory 304, a digital interface unit (I/F) 305, and a communication terminal 306.

The CPU 301 integrally controls the components of the terminal 105. The CPU 301 executes a program stored in the memory 304. The CPU 301 may perform control by using hardware.

The memory 304 is a storage device used as a storage area of the program to be executed by the CPU 301, a work area during execution of the program, and a data storage area.

The input unit 302 is a functional unit that receives an input operation performed by a user, and may include various kinds of input devices such as a button, a cross key, a touch panel, and a mouse.

The input operation received by the input unit 302 includes an input operation of an instruction to transmit the various kinds of commands to the imaging apparatuses 101 to 103. Upon receiving the input operation, the input unit 302 notifies the CPU 301 of reception of the input operation. The CPU 301 generates commands to the imaging apparatuses 101 to 103 in response to the notification. Then, the CPU 301 instructs the I/F 305 to transmit the generated commands to the imaging apparatuses 101 to 103.

The input unit 302 also performs processing to receive input of a user response to an inquiry message to the user, which is generated by the CPU 301 executing the program stored in the memory 304.

The display unit 303 is a functional unit that displays a result of the processing performed by the CPU 301. More specifically, the display unit 303 may be a display device such as a liquid crystal display device, a plasma display device, or a cathode-ray tube (CRT) display device. In the case where the CPU 301 generates the inquiry message to the user, the display unit 303 transmits the message to the user by displaying the message.

The I/F 305 is a functional unit that receives an instruction from the CPU 301 and transmits the commands to the imaging apparatuses 101 to 103 via the communication terminal 306. The I/F 305 also performs processing to receive responses to the commands and the streamed original videos from the imaging apparatuses 101 to 103 via the communication terminal 306. The original videos received by the I/F 305 are supplied to the CPU 301. The CPU 301 decodes and expands the original videos supplied from the I/F 305 and supplies the original videos to the display unit 303. The display unit 303 displays the original videos supplied from the CPU 301.

The communication terminal 306 includes a local area network (LAN) terminal to which a LAN cable is connected. While the hardware configuration of the terminal 105 according to the present exemplary embodiment has been described above, the hardware configuration illustrated in FIG. 3 illustrates a suitable example of the terminal 105 according to the present exemplary embodiment, and the hardware configuration is not limited to the configuration in FIG. 3. For example, various modifications and alternations, such as provision of an audio input unit and an audio output unit, can be made within the scope of the present disclosure.

Figure 4:
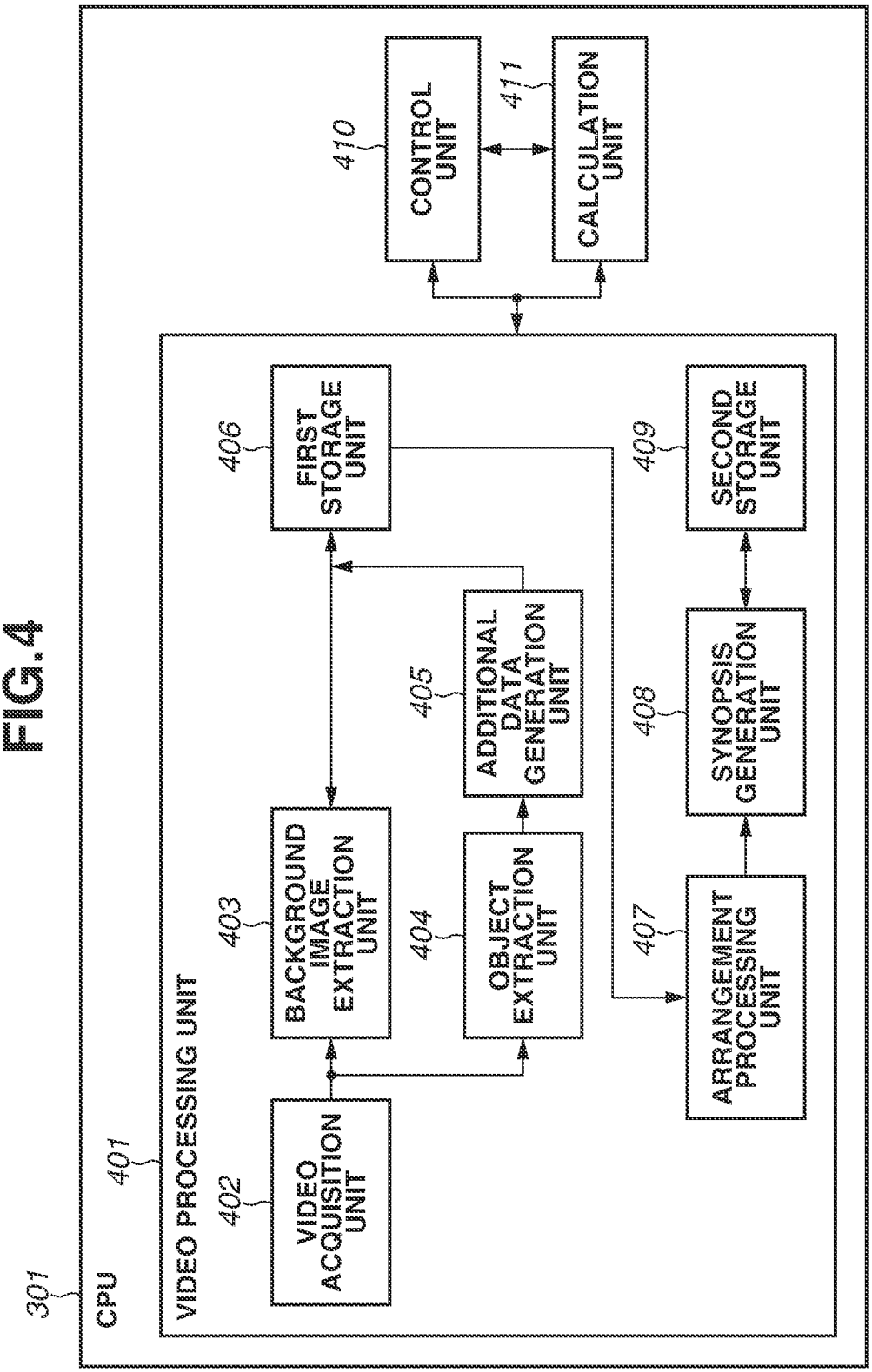
FIG. 4 is a functional block diagram illustrating functions of the terminal implemented by a central processing unit (CPU) illustrated in FIG. 3.

FIG. 4 is a functional block diagram illustrating functions of the terminal 105 implemented by the CPU 301 illustrated in FIG. 3. Hereinafter, the functions of the terminal 105 for generating a synopsis video according to the present exemplary embodiment are described in detail with reference to FIG. 4. FIG. 4 mainly illustrates functional blocks relating to generation of the synopsis video, and other functions of the terminal 105 are not limited to the illustrated configuration.

As illustrated in FIG. 4, the terminal 105 includes a video processing unit 401, a control unit 410, and a calculation unit 411 as functional units. The video processing unit 401 is a functional unit that performs processing to generate the synopsis video from an input video. The video processing unit 401 includes a video acquisition unit 402, a background image extraction unit 403, an object extraction unit 404, an additional data generation unit 405, a first storage unit 406, an arrangement processing unit 407, a synopsis generation unit 408, and a second storage unit 409.

The control unit 410 and the calculation unit 411 are functional units that process commands from program data stored in the memory 304 (see FIG. 3), which is included inside the terminal 105, and perform calculation processing. More specifically, the control unit 410 performs control to, for example, transmit a command included in the program data stored in an external memory of the CPU 301 to the video processing unit 401, and transmit an instruction from the video processing unit 401 to the outside of the CPU 301. The calculation unit 411 performs various kinds of calculation processing and processing to compare images based on the command provided by the control unit 410. As a result, on the terminal 105, the user can control the imaging apparatuses 101 to 103 and provide various instructions on a screen while viewing the display unit 303. The control unit 410 also performs processing to reproduce the synopsis video generated by the video processing unit 401.

The video acquisition unit 402 acquires the original videos from the imaging apparatuses 101 to 103 and performs processing to determine a moving image format of the original videos so that each of frames constituting the original videos can be analyzed. The video acquisition unit 402 also performs conversion of the moving image format as necessary.

The background image extraction unit 403 performs processing to extract a background image from each of the plurality of original videos acquired by the video acquisition unit 402. For example, a scene including no object may be previously captured by each of the imaging apparatuses 101 to 103, and videos obtained as a result may be stored in the first storage unit 406 in association with the respective imaging apparatuses 101 to 103. Then, an area where no object is detected may be extracted and may be partially updated.

Figure 5:
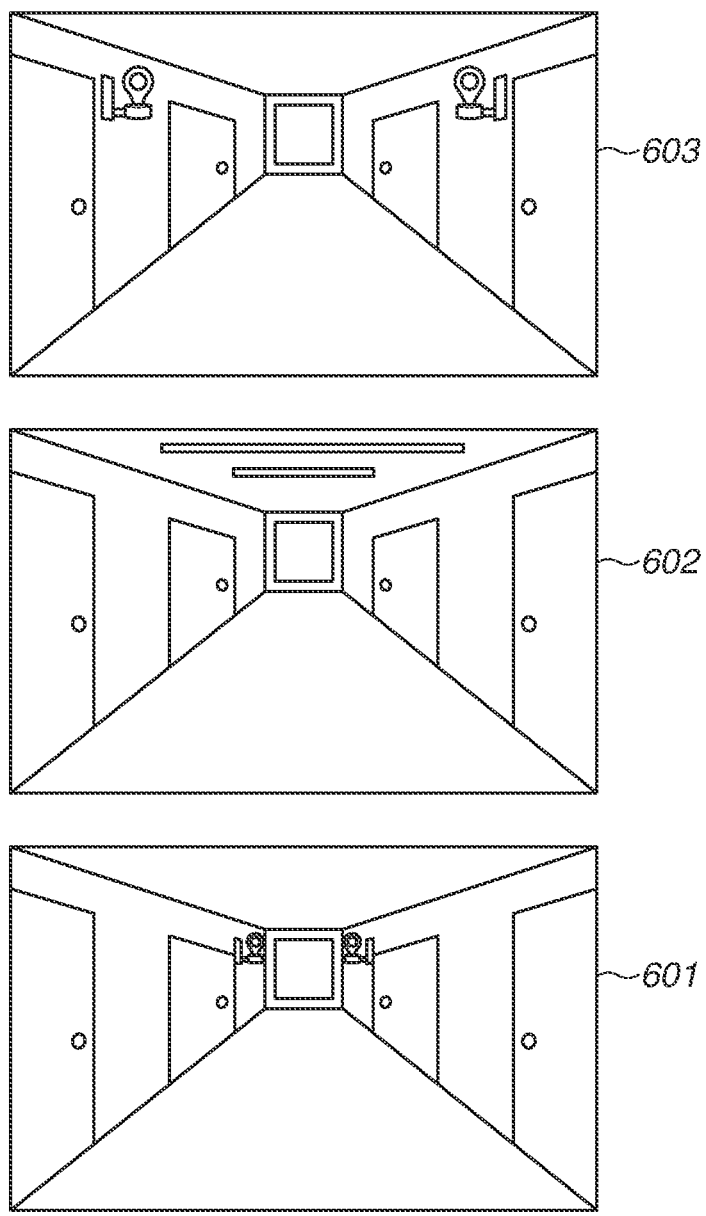
FIG. 5 is a diagram illustrating an example of background images extracted by a background image extraction unit.

FIG. 5 is a diagram illustrating an example of background images extracted by the background image extraction unit 403. Background images 601 to 603 illustrated in FIG. 5 are respectively extracted from the original videos 202 to 204 illustrated in FIG. 2.

The background image extraction unit 403 further superimposes the plurality of background images acquired from the respective imaging apparatuses 101 to 103, and determines similarity among them. In a case where the similarity is greater than or equal to a predetermined threshold as a result of the determination, the background image extraction unit 403 determines that the original videos from the imaging apparatuses 101 to 103 can be summarized on the same background image. Then, the background image extraction unit 403 performs processing to select a background image to be used in the synopsis video from among the plurality of extracted background images and to store the selected background image in the first storage unit 406. The detail of the processing is described below. In a case where the similarity is less than the predetermined threshold, the background image extraction unit 403 determines that the original videos from the imaging apparatuses 101 to 103 cannot be summarized on the same background image. Then, the background image extraction unit 403 stores the plurality of extracted background images in the first storage unit 406.

The object extraction unit 404 performs processing to extract one or more pieces of object information each representing a trajectory of an object from each of the plurality of original videos acquired by the video acquisition unit 402 and to store the object information in the first storage unit 406. For example, the object is extracted by using a known method such as a background difference method and a human body detection method. The object extraction unit 404 uses a center of an extracted pixel area as coordinates of the object and uses the pixel area as a range of the object. The object information specifically includes time-series information on the coordinates (x, y) and the range of the extracted object. The object extraction unit 404 also stores information indicating in which frame the detected object appears and in which frame the detected object disappears (starting time and duration) in the first storage unit 406.

The extraction by the object extraction unit 404 may be performed by using the technique discussed in Japanese Patent No. 4972095. In addition, any extraction method may be used as long as the object can be extracted.

The additional data generation unit 405 adds, as one of metadata, identification information on an imaging apparatus to the object information in order to grasp by which imaging apparatus the object extracted by the object extraction unit 404 has been acquired. As the identification information on the imaging apparatus, an IP address, an identification number, and a camera name of the imaging apparatus are expected. A color of a time stamp or a detection frame described below that is displayed to be superimposed on the object is determined based on the identification information on the imaging apparatus. However, any information can be used as the identification information on the imaging apparatus as long as the information can associate the imaging apparatus capturing the object with the object in the synopsis video.

The first storage unit 406 stores one or the plurality of background images stored by the background image extraction unit 403 and the one or more pieces of object information stored by the object extraction unit 404. As a result, the first storage unit 406 functions as a storage area of the information necessary for implementing the functions described below.

The arrangement processing unit 407 performs processing to once arrange all of the one or more pieces of object information extracted by the object extraction unit 404 in a time-series order. The reason for performing the processing is because, if the one or more pieces of object information extracted from the imaging apparatuses are superimposed on one video, the pieces of object information may be displayed at the same coordinates in an overlapping manner at the same timing. To grasp occurrence/non-occurrence of such a situation, the arrangement processing unit 407 uses the technique discussed in Japanese Patent No. 4972095 to collectively arrange all the pieces of the object information in a time-series order. Then, to prevent the pieces of object information from being displayed in an overlapping manner, the arrangement processing unit 407 performs processing to shift the starting time of each of the pieces of object information and to rearrange the object information. The detail of the rearrangement processing is described below.

The first storage unit 406 may store the pieces of object information in a table collectively including coordinates information, time information (staying time), and imaging apparatus information.

The synopsis generation unit 408 performs processing to summarize the original videos based on arrangement generated by the arrangement processing unit 407 (i.e., one or more pieces of object information processed by the arrangement processing unit 407) and the background images stored in the first storage unit 406 by the background image extraction unit 403. The detail thereof will be described below. A synopsis video obtained by gathering the one or more pieces of object information extracted from the imaging apparatuses on one background image is generated by summarization processing. The synopsis generation unit 408 also performs processing to add information (e.g., color information described above) for identifying the imaging apparatus corresponding to each piece of the Object information disposed in the synopsis video.

The synopsis generation unit 408 once stores the generated synopsis video in the second storage unit 409. As a result, the synopsis video stored in the second storage unit 409 is put into a state of waiting for rasterization in a display area, and is reproduced by the control unit 410 in response to an instruction by the user.

Next, a flow of the processing to generate one synopsis video based on the plurality of original videos from the plurality of imaging apparatuses is specifically described with reference to a flowchart illustrated in FIG. 6 as well as FIG. 4. The processing in the flowchart is performed by the CPU 301 based on a control program read out to the memory 304. In the present exemplary embodiment, to generate the synopsis video, chronological order of appearance of the targets is changed from the order in the original videos without moving spatial positions of the pieces of the object information from the plurality of imaging apparatuses.

The arrangement processing unit 407 determines the starting time of a motion trajectory of each of the objects extracted from the original videos captured by the plurality of imaging apparatuses in the synopsis video so as to minimize the number of collisions among motion trajectories of all of the objects and to reduce a reproduction time.

Collision among the motion trajectories of the objects is described. The arrangement processing unit 407 calculates a collision cost $Col_{ij}(k)$ between targets i and j by using the following formula (1). In the formula (1), k is a time difference in the starting time between the targets i and j, $x_t^i$ and $y_t^i$ are an x coordinate and a y coordinate of a center of the target i at time t, and is a radius of the target i at the time t. In addition, $T_{ij}(k)$ is a period in which the motion trajectories of both of the targets i and j appear in the video when the time difference in the starting time is k. Further, an expression inside an absolute value symbol on a right side in the formula (1) has a relatively large value representing presence of collision in a case where a distance between the center of the target i and a center of the target j is less than a sum of the radius of the target i and a radius of the target j and has a relatively small value representing absence of collision in other cases. Accordingly, the larger the collision cost $Col_{ij}(k)$ is, the larger the number of frames in which the targets i and j collide with each other is.

[Formula 1]

$$Col_{ij}(k) = \sum_{t \in T_{ij}(k)} \left| (x_t^i - x_{t+k}^j)^2 + (y_t^i - y_{t+k}^j)^2 < (r_t^i)^2 + (r_{t+k}^j)^2 \right| \quad (1)$$

The arrangement processing unit 407 uses a simulated annealing method to determine the starting times at which the collision cost $Col_{ij}(k)$ becomes the minimum in all of combinations of the targets. By using the simulated annealing method, it is possible to efficiently calculate a nonlinear programming problem with a limit in range.

Accordingly, the arrangement processing unit 407 uses the simulated annealing method to determine the starting time of each of the targets, thereby determining an optimum starting time of each of the targets in the synopsis video. The arrangement processing unit 407 generate the synopsis video in the above-described manner by changing an order of appearance while maintaining the spatial positions of the targets in the original videos. More specifically, the synopsis video is generated in such a manner that images of the targets each extracted using a pixel mask from the original videos are pasted on the background image based on the calculated starting times.

FIG. 6 is a flowchart illustrating the processing performed by the terminal 105 according to the present exemplary embodiment. As illustrated in FIG. 6, in step S101, the video acquisition unit 402 of the terminal 105 first acquires the original videos from the respective imaging apparatuses. In this example, the original videos are acquired from the respective imaging apparatuses; however, videos stored in an external memory or a storage may be acquired as the original videos.

Next, in step S102, the object extraction unit 404 of the terminal 105 extracts the above-described object information from each of the acquired original videos, and stores the object information in the first storage unit 406.

Next, in step S103, the background image extraction unit 403 of the terminal 105 extracts the background image from each of the original videos captured by the respective imaging apparatuses, and selects the background image to be used in the synopsis video from among the plurality of extracted background images.

For example, the background image is selected by using one of two selection methods, i.e., (i) to select a background image of the imaging apparatus with the largest number of pieces of extracted object information, and (ii) to select the background image of the imaging apparatus with the smallest number of pieces of extracted object information. In the case of using the former selection method, it is possible to minimize influence in a case where the backgrounds are largely different among the imaging apparatuses. In the case of using the latter selection method, it is possible to enhance accuracy of the background image because an update frequency of the background image is increased based on appearance of the object.

While a still image is basically used as the background image, the background image extraction unit 403 may select a different still image corresponding to a different time of day at which each of the original videos is captured. This makes it possible to appropriately deal with change in ambient light between daytime and nighttime.

Next, in step S104, the additional data generation unit 405 of the terminal 105 performs processing to add the identification information (e.g., color, number, character) on the imaging apparatus to an outer rim (detection frame) of the object information or the time stamp (time information) displayed to be superimposed on the object information displayed in the synopsis video. The processing is performed to enable the user viewing the synopsis video to grasp the imaging apparatus that has captured each of the objects.

Figure 7A:
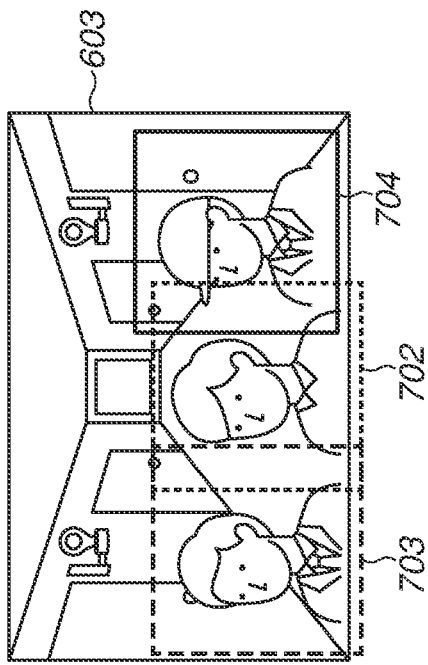
FIGS. 7A, 7B, and 7C are diagrams each illustrating an example of a synopsis video generated as a result of the processing in FIG. 6.
Figure 7C:
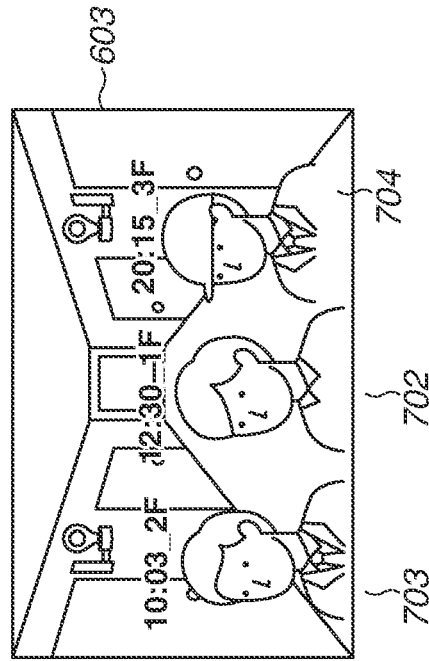
Figure 7B:
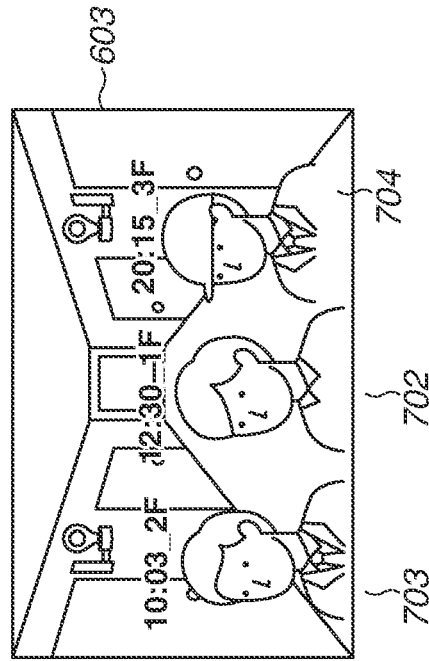

FIGS. 7A to 7C are diagrams each illustrating an example of the synopsis video generated as a result of the processing in step S104. FIGS. 7A to 7C each illustrate a case where the background image 603 illustrated in FIG. 5 is selected as the background image.

FIG. 7A illustrates an example in which colors are added to the detection frames. However, since chromatic colors are unusable in patent drawings, types of lines are changed to represent different colors as an alternative illustration in FIG. 7A. More specifically, a detection frame of an object 702 captured by the imaging apparatus 101 on the first floor (see FIG. 2) is indicated by a dashed line. A detection frame of an object 703 captured by the imaging apparatus 102 on the second floor is indicated by a long dashed line. A detection frame of an object 704 captured by the imaging apparatus 103 on the third floor is indicated by a solid line.

FIG. 7B illustrates an example in which a color is added to the time stamp. In the example, a time stamp "12:30" of the object 702 captured by the imaging apparatus 101 on the first floor is indicated by red characters. A time stamp "10:03" of the object 703 captured by the imaging apparatus 102 on the second floor is indicated by green characters. A time stamp "20:15" of the object 704 captured by the imaging apparatus 103 on the third floor is indicated by yellow characters.

FIG. 7C illustrates an example in which character information is added to the time stamp. In the example, characters "_1F" are added to the time stamp "12:30" of the object 702 captured by the imaging apparatus 101 on the first floor. Characters "_2F" are added to the time stamp "10:03" of the object 703 captured by the imaging apparatus 102 on the second floor, Characters "_3F" are added to the time stamp "20:15" of the object 704 captured by the imaging apparatus 103 on the third floor.

Next, in step S105, the arrangement processing unit 407 of the terminal 105 once arranges the one or more pieces of object information extracted by the object extraction unit 404 in a time-series order. More specifically, the arrangement processing unit 407 arranges all the pieces of the object information stored in the first storage unit 406 and analyses the object information.

In step S106, the arrangement processing unit 407 of the terminal 105 detects an overlapping area where a plurality of pieces of object information is displayed at the same coordinates in an overlapping manner at the same timing in the synopsis video from the object information arranged in step S105. The reason for performing the processing is because, when the objects captured by the respective imaging apparatuses are displayed in one synopsis video, the objects may be present at the same coordinates at the same timing.

FIG. 8 is a diagram illustrating the overlapping area. The original videos 202 to 204 respectively captured by the imaging apparatuses 101 to 103 are illustrated on an upper side of FIG. 8. As illustrated in FIG. 8, the original videos 202 to 204 include objects 801 to 807. Further, in each diagram on the upper side of FIG. 8, a trajectory corresponding to each of the objects 801 to 807 is illustrated behind each of the objects 801 to 807. In FIG. 8, the trajectories of the objects 801 to 803 captured by the imaging apparatus 101 are indicated by long dashed lines, the trajectories of the objects 804 and 805 captured by the imaging apparatus 102 are indicated by dashed lines, and the trajectories of the objects 806 and 807 captured by the imaging apparatus 103 are indicated by solid lines.

An all object information arrangement diagram 808 that has a lateral axis representing a coordinate axis x and a vertical axis representing a time axis t is illustrated on a lower side of FIG. 8. The trajectories illustrated in the diagrams on the upper side of FIG. 8 are illustrated in the all object information arrangement diagram 808. Among the trajectories illustrated in the all object info nation arrangement diagram 808, a trajectory 809 represents the trajectory of the object 804, and a trajectory 810 represents the trajectory of the object 802. It is understood from FIG. 8 that the two trajectories 809 and 810 are overlapped in the same time period.

In a case where the overlapping area is detected, in step S107, the arrangement processing unit 407 performs processing to shift the starting time of at least one piece of the object information so as to eliminate the overlapping area and to rearrange the object information. The processing is performed in the above-described manner.

FIGS. 9A and 9B are diagrams each illustrating an example of the processing in step S107. The reference numerals 808 to 810 in FIGS. 9A and 9B represent the same components illustrated in the diagram on the lower side of FIG. 8.

FIG. 9A illustrates an example in which two pieces of object information to be displayed in an overlapping manner are displayed within the shortest time. In this case, the arrangement processing unit 407 corrects the starting time of one of the two pieces of object information to be displayed in an overlapping manner based on a time immediately after the end of the other piece of object information. In the example of FIG. 9A, a correction is made so that the starting time of the trajectory 810 is a time immediately after the end of the trajectory 809. An order of display of the object information (display order in the synopsis video) in this case preferably is an ascending order of management numbers of the imaging apparatuses.

FIG. 9B illustrates an example in which the plurality of pieces of object information captured by the same imaging apparatus is displayed so as to be temporally overlapped with one another. In this case, the arrangement processing unit 407 corrects the starting time of at least one of the two pieces of overlapping object information so that, for example, the plurality of pieces of object information from the imaging apparatus designated by the user is displayed at the same timing as much as possible. In the example of FIG. 9B, the starting time of the trajectory 809 is corrected so that the trajectory 809 and a trajectory of the other object captured by the imaging apparatus 102 are displayed at the same timing.

Alternatively, in place of shifting the starting time as described above, one of the two pieces of overlapping object information may be pop-up displayed or thumbnail-displayed. More specifically, the arrangement processing unit 407 may add predetermined flag information to one of the two pieces of object information to be displayed in an overlapping manner. The object information added with the flag information may be pop-up displayed or thumbnail-displayed when the control unit 410 reproduces the synopsis video. As for the object information that is not pop-up displayed or thumbnail-displayed but is normally displayed on the background image, the object information obtained from the imaging apparatus capturing the background image in use is preferably selected.

Whether to gather the object information from the plurality of imaging apparatuses in one synopsis video may be determined based on density of the objects in the synopsis video. For example, in a case where the object information from the plurality of imaging apparatuses is collectively displayed in one synopsis video, an area occupied by the objects may exceed a predetermined ratio (e.g., 60%) of the screen. In such a case, in place of gathering the object information from the plurality of imaging apparatuses in one synopsis video, a synopsis video for each of the imaging apparatuses may be generated.

Next, in step S108, the synopsis generation unit 408 generates a synopsis video that is obtained by gathering the one or more pieces of object information extracted in step S102 on one background image based on the arrangement generated by the arrangement processing unit 407 (through the processing in step S107).

Figure 10:
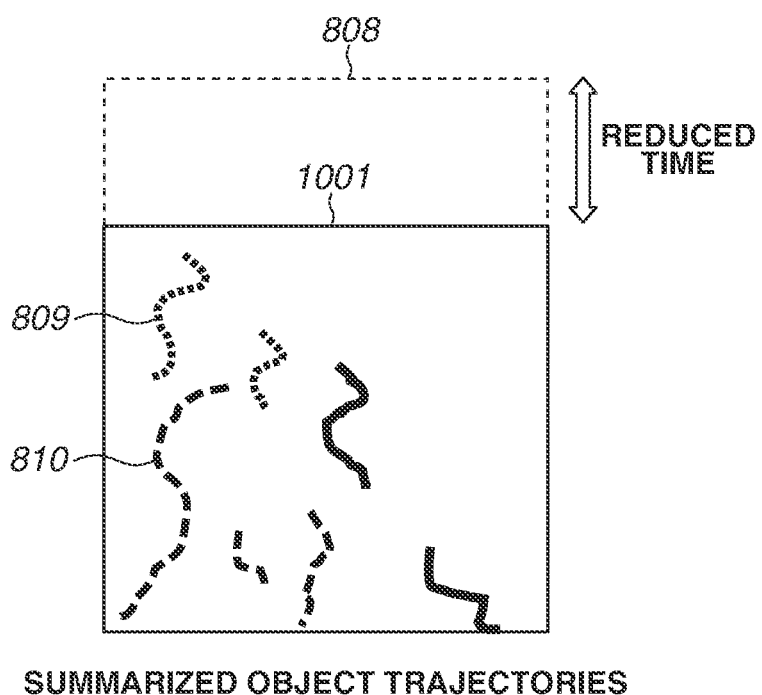
FIG. 10 is a diagram illustrating an all object information arrangement diagram in the synopsis video.

FIG. 10 is a diagram illustrating an all object information arrangement diagram 1001 in the synopsis video. The all object information arrangement diagram 1001 is generated based on the all object information arrangement diagram 808 illustrated in FIG. 9A or FIG. 9B.

It is understood from FIG. 10 that the summarization processing is processing to change the starting time of each piece of the object information within a range not overlapping with another piece of the object information. This makes it possible to reduce a reproduction time of the video as much as possible within a range where the pieces of object information do not overlap with one another. In a case where a larger effect can be expected from the summarization processing if the object information is moved until the object information partially overlaps with another piece of the object information, processing to thin the overlapping portion (deletion of frames) may be performed.

The synopsis generation unit 408 may collectively arrange the object information for each corresponding imaging apparatus in the synopsis video.

Finally, in step S109, the control unit 410 of the terminal 105 reproduces the synopsis video. Thus, the series of processing to generate the synopsis video from the original videos captured by the plurality of imaging apparatuses ends.

As described above, in the synopsis video generation system 1 according to the present exemplary embodiment, the plurality of original videos captured by the plurality of imaging apparatuses is collectively reproduced as one synopsis video. This makes it possible to check the videos in a short time as compared with the existing technique.

A configuration of an imaging apparatus according to a second exemplary embodiment is described. Description of parts equivalent to the parts illustrated in the first exemplary embodiment is omitted, in the above-described first exemplary embodiment, the configuration to gather the plurality of original videos from the plurality of imaging apparatuses in one synopsis video is described. In the second exemplary embodiment, processing when an object is selected during reproduction of the synopsis video is described.

Figure 11:
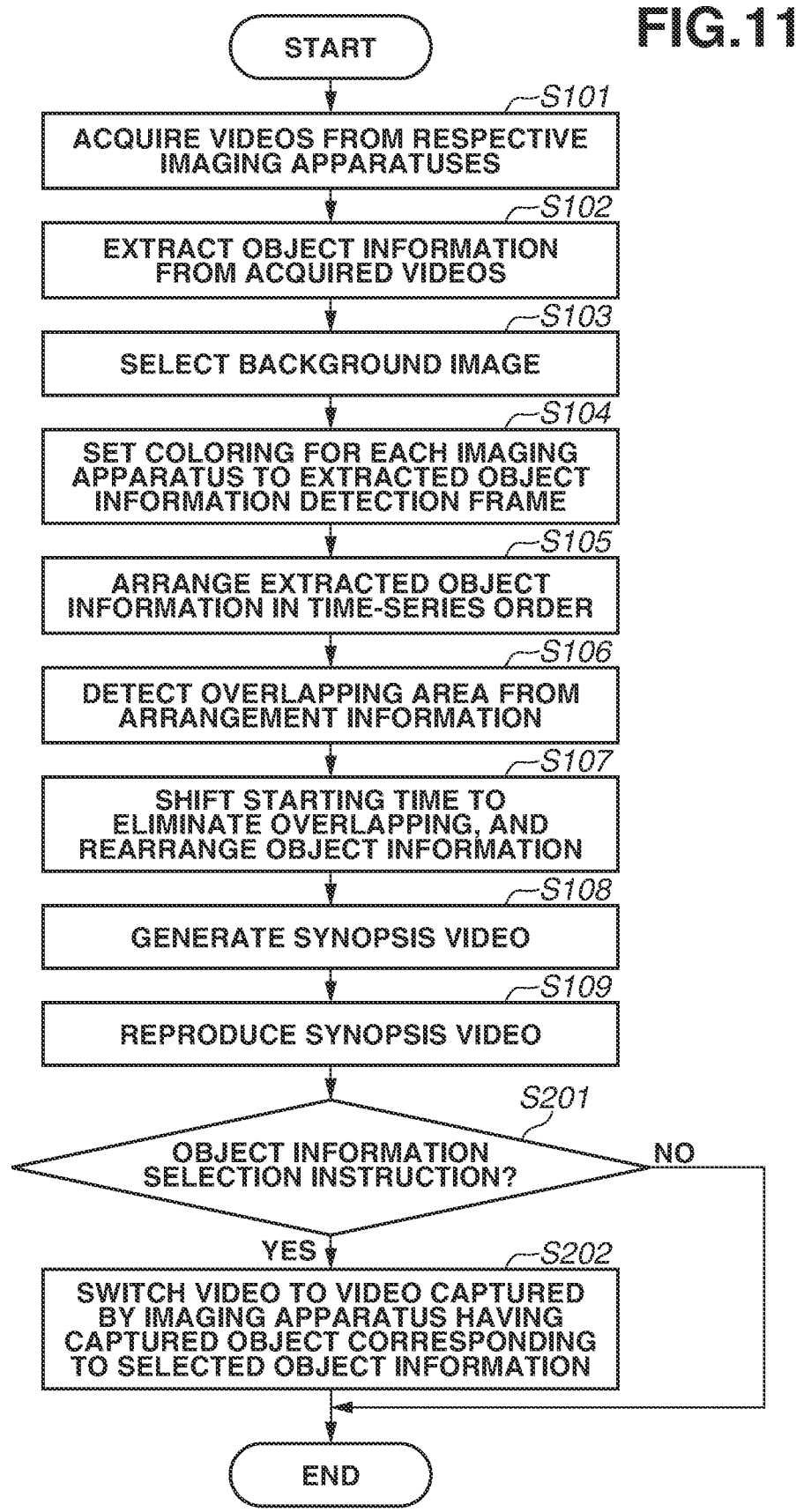
FIG. 11 is a flowchart illustrating processing performed by a terminal according to a second exemplary embodiment of the present disclosure.

FIG. 11 is a flowchart illustrating processing performed by the terminal 105 according to the present exemplary embodiment. Hereinafter, a specific operation of the terminal 105 when the user selects an object during reproduction of the synopsis video that is generated based on the plurality of original videos from the plurality of imaging apparatuses is described with reference to FIG. 11. Processing in steps S101 to S109 in FIG. 11 is similar to the processing in steps S101 to S109 illustrated in FIG. 5. Thus, description thereof is omitted.

During reproduction of the synopsis video in step S109, in step S201, the control unit 410 receives an instruction operation to select the object information from the user. The selection instruction operation may be performed, with a mouse, by the user viewing a monitor displaying the synopsis video. In a case where the selection instruction operation is performed by the user (YES in step S201), in step S202, the control unit 410 switches the video being reproduced to the synopsis video that is generated from only the original video captured by the imaging apparatus that has captured the object corresponding to the selected object information. On the other hand, in a case where reproduction of the synopsis video ends without the selection instruction operation (NO in step S201), the control unit 410 ends the processing without performing the processing in step S202.

A diagram on a left side in FIG. 12 is a diagram illustrating a synopsis video 205 in which the original videos 202 to 204 illustrated in FIG. 8 are collectively displayed. A diagram on a right side in FIG. 12 is a diagram illustrating a synopsis video 206 from only the original video 202 illustrated in FIG. 8. If the user selects the object 803 (surrounded by a black frame) in the synopsis video 205 in the diagram on the left side in FIG. 12, the terminal 105 summarizes the original video 202 captured by the imaging apparatus 101, which has captured the object 803, and reproduces the synopsis video as illustrated in the diagram on the right side in FIG. 12.

A diagram on a left side in FIG. 13 is a diagram illustrating the all object information arrangement diagram 1001 same as in the diagram in FIG. 10. A diagram on a right side in FIG. 13 is a diagram illustrating an all object information arrangement diagram 1304 of the synopsis video 206 illustrated in the diagram on the right side in FIG. 12. Trajectories 1301 and 1302 illustrated in FIG. 13 are trajectories of the objects 803 and 801, respectively. As understood from FIG. 13, in the case where only the original video 202 captured by the imaging apparatus 101 is summarized and the synopsis video is reproduced, reproduction may end in a time shorter than the reproduction time of the synopsis video 205 in which the original videos 202 to 204 are collectively displayed (the all object information arrangement diagram 1304 is smaller than the all object information arrangement diagram 1001).

While not illustrated, in a case where the object the same as the object of the selected object information is detected by the plurality of imaging apparatuses, a synopsis video obtained by gathering the plurality of pieces of the object information on the object may be reproduced. Alternatively, the synopsis videos obtained from only the respective original videos captured by the plurality of imaging apparatuses that has captured the object may be sequentially switched and reproduced.

As described above, in the synopsis video generation system 1 according to the present exemplary embodiment, if the user finds an object to be specifically checked while checking the synopsis video obtained by gathering the object information included in the plurality of original videos, the user can check the object information in detail.

Even when the object information is not selected, the synopsis video obtained by gathering the object information included in the plurality of original videos and the synopsis videos from only the respective original videos captured by the respective imaging apparatuses may be switched.

While the exemplary embodiments of the present disclosure have been described in detail with reference to the drawings, the present disclosure is not limited to these specific exemplary embodiments and includes various modes without departing from the scope of the present disclosure. Parts of the above-described exemplary embodiments may be appropriately combined.

For example, in a synopsis video of videos captured inside a moving object such as a train, information on an imaging position may be acquired using a positional information system such as a global positioning system (GPS). The acquired information on the imaging position may be added as one of the above-described metadata to the object information. This makes it possible to add positional information representing that the object has been captured at which station to each of the objects in the synopsis video by using colors, characters, and the like.

The present disclosure can be realized by supplying a program implementing a part or one or more of the functions of the above-described exemplary embodiments to a system or an apparatus via a network or a storage medium, and causing one or more processors in a computer (or a CPU, microprocessor unit (MPU), etc.) of the system or the apparatus to read out and execute the program. Further, the program may be provided by being recorded in a computer-readable recording medium.

Further, the present disclosure is not limited to the configuration in which the functions of the exemplary embodiments are implemented by execution of the program read out by the computer. For example, an operating system (OS) or the like operating on the computer may perform a part or all of actual processing based on an instruction from the program, and the functions of the above-described exemplary embodiment may be implemented by the processing.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-188340, filed Oct. 15, 2019, which is hereby incorporated by reference herein in its entirety.

What is claimed is:

1. An information processing apparatus that changes an appearance order of targets detected in a video to generate a synopsis video, the information processing apparatus comprising:
    a processor; and
    a memory storing executable instructions which, when executed by the processor, cause the image processing apparatus to perform operations including:
    acquiring a plurality of videos captured by a plurality of imaging apparatuses;
    extracting one or more pieces of object information each representing a trajectory of an object from each of the plurality of acquired videos;
    generating a synopsis video obtained by gathering objects on one background image based on the extracted object information; and
    reproducing the generated synopsis video,
    wherein, in a case where object information displayed in the generated synopsis video is selected by a user during reproduction of the generated synopsis video, a synopsis video obtained only from a video captured by the imaging apparatus having captured the selected object information is reproduced instead of the generated synopsis video.

2. The information processing apparatus according to claim 1, wherein the generated synopsis video is generated by changing a starting time of each of the one or more pieces of object information within a range not overlapping with the other pieces of object information.

3. The information processing apparatus according to claim 1, wherein the background image is an image captured by an imaging apparatus having captured a video from which a largest number of pieces of object information is extracted.

4. The information processing apparatus according to claim 1, wherein the background image is an image captured by an imaging apparatus having captured a video from which a smallest number of pieces of object information is extracted.

5. The information processing apparatus according to claim 1, wherein the plurality of videos are acquired from a plurality of imaging apparatuses having high similarity between background images.

6. The information processing apparatus according to claim 1, wherein executing the executable instructions causes the information processing apparatus to perform further operations including: adding identification information on an imaging apparatus to an outer rim of the object information displayed in the synopsis video.

7. The information processing apparatus according to claim 1, wherein executing the executable instructions causes the information processing apparatus to perform further operations including: adding identification information on an imaging apparatus to time information displayed to be superimposed on the object information in the synopsis video.

8. The information processing apparatus according to claim 6, wherein the identification information is a different color for each imaging apparatus.

9. The information processing apparatus according to claim 6, wherein the identification information includes a different number for each imaging apparatus.

10. The information processing apparatus according to claim 1, wherein executing the executable instructions causes the information processing apparatus to perform further operations including: performing, in a case where an overlapping area where a plurality of pieces of object information is displayed at a same coordinate in an overlapping manner at same timing in the synopsis video is detected, processing to shift a starting time of at least one of the one or more pieces of object information to eliminate the overlapping area,
    and correcting a starting time of one of two pieces of object information to be displayed in an overlapping manner to be a time immediately after an end of another piece of object information.

11. The information processing apparatus according to claim 1, wherein executing the executable instructions causes the information processing apparatus to perform further operations including: performing, in a case where an overlapping area where a plurality of pieces of object information is displayed at a same coordinate in an overlapping manner at same timing in the synopsis video is detected, processing to shift a starting time of at least one of the one or more pieces of object information to eliminate the overlapping area, and correcting
    a starting time of one of two pieces of object information to be displayed in an overlapping manner to cause a plurality of pieces of object information from one imaging apparatus to be displayed at same timing.

12. The information processing apparatus according to claim 1, wherein executing the executable instructions causes the information processing apparatus to perform further operations including:
    adding, in a case where an overlapping area where a plurality of pieces of object information is displayed at a same coordinate in an overlapping manner at same timing in the synopsis video is detected, predetermined flag information to one of two pieces of object information to be displayed in an overlapping manner, wherein object information not added with the predetermined flag information is displayed in the synopsis video and object information added with the predetermined flag information is pop-up displayed.

13. The information processing apparatus according to claim 1, wherein the extracted object information is arranged collectively for each imaging apparatus in the synopsis video.

14. The information processing apparatus according to claim 1, wherein, in a case where an object same as an object of the selected object information is detected by the plurality of imaging apparatuses, synopsis videos obtained only from respective videos captured by the plurality of imaging apparatuses having captured the object is sequentially reproduced.

15. The information processing apparatus according to claim 1, wherein, in a case where an object same as an object of the selected object information is detected by the plurality of imaging apparatuses, a synopsis video obtained by gathering a plurality of pieces of object information on the object is reproduced.

16. An information processing system, comprising:
a plurality of imaging apparatuses configured to capture a plurality of videos; and
the information processing apparatus according to claim 1 configured to acquire the plurality of videos from the plurality of imaging apparatuses to generate a synopsis video.

17. An information processing method that changes an appearance order of targets detected in a video to generate a synopsis video, the information processing method comprising:

acquiring a plurality of videos captured by a plurality of imaging apparatuses;
extracting one or more pieces of object information each representing a trajectory of an object from each of the plurality of acquired videos; and
generating a synopsis video obtained by gathering objects on one background image based on the extracted object information; and
reproducing the generated synopsis video,
wherein, in a case where object information displayed in the generated synopsis video is selected by a user during reproduction of the generated synopsis video, a synopsis video obtained only from a video captured by the imaging apparatus having captured the selected object information is reproduced instead of the generated synopsis video.

18. A non-transitory computer-readable storage medium storing computer executable instructions for causing a computer to execute a display control method comprising:
acquiring a plurality of videos captured by a plurality of imaging apparatuses;
extracting one or more pieces of object information each representing a trajectory of an object from each of the plurality of acquired videos;
generating a synopsis video obtained by gathering objects on one background image based on the extracted object information; and
reproducing the generated synopsis video,
wherein, in a case where object information displayed in the generated synopsis video is selected by a user during reproduction of the generated synopsis video, a synopsis video obtained only from a video captured by the imaging apparatus having captured the selected object information is reproduced instead of the generated synopsis video.

\* \* \* \* \*